May 2, 1961  H. T. LYMAN  2,982,138
GYROSCOPE
Filed March 14, 1960  2 Sheets-Sheet 1

INVENTOR
Harley T. Lyman

BY
AGENT

May 2, 1961     H. T. LYMAN     2,982,138
GYROSCOPE

Filed March 14, 1960                       2 Sheets-Sheet 2

INVENTOR
Harley T. Lyman

BY

AGENT

United States Patent Office 2,982,138
Patented May 2, 1961

2,982,138
GYROSCOPE
Harley T. Lyman, Portland, Oreg., assignor to Iron Fireman Manufacturing Company, a corporation of Oregon Filed Mar. 14, 1960, Ser. No. 14,907
4 Claims. (Cl. 74—5.1)

This invention relates generally to a gyroscope and more particularly to a gyroscope provided with an electric motor for driving the spin wheel thereof and a gravity pendulum controlled air jet system for continuously erecting the spin axis of the gyroscope towards its gravity vertical position.

More particularly it is the primary purpose of this invention to provide for such a gyroscope a simple, reliable, economical and unexpectedly useful caging means of small size to be added thereto for the purpose of speeding and making safe the initial erection, or caging, thereof.

It is well known in the art that gyroscopes of this general type provided with continuous erecting means but without additional initial caging will come up to a required wheel speed and after a sufficient time come up to an erect position. Such a gyroscope is completely shown and described in U.S. Patent No. 2,772,570, Gyroscope, issued December 4, 1956, to A. L. Judson.

However, without initial caging help, if such a gyroscope must start from zero wheel speed with the spin axis much over forty-five degrees from its gravity vertical position, the frictional forces resisting movement of the gyroscope parts about the various axes thereof will tend to cause irregular alternate movements of the spin axis about the two gimbal axes by precession and thereby result in a more or less violent nutation of the spin axis as the spin axis works its way to an erect position.

To prevent the destruction of the gyroscope due to nutation or to prevent the noise and vibration due thereto, simple manually operated arrangements of gimbal caging cams and cam followers were used. Later more elegant electrical push button operated gimbal cams and cam followers were used but these systems are both large and expensive and their use is only justified in systems where such rapid and accurate action is required as shown in U.S. Patents No. 2,887,884, issued to R. D. Hochstetler and I. B. Thierman on May 26, 1959, and No. 2,874,577, issued February 24, 1959, to O. W. Shirley. U.S. Patent Nos. 2,772,570 and 2,874,577 and 2,887,884 as well as this present invention and this application are all assigned to the Iron Fireman Manufacturing Company.

The present invention is based on the conception of the need for and the discovery of means for filling the need for a simple, low cost, completely automatic apparatus of relatively small size for initially caging a gyroscope having means for the continuous erection thereof after said initial caging.

An important element of this invention is the discovery that if one gimbal ring only of the gyroscope is caged and that the caged ring is released shortly after the spin motor together with the continuous erection means of the gyroscope are energized the gyroscope will be rapidly erected without serious nutation and thereafter will be maintained in a substantially erect position by the continuous erecting means.

It is a second object of this invention to provide for a gyroscope having an erection system which is continuously effective after the spin motor of said gyroscope is up to speed, an outer gimbal caging cam secured on said outer gimbal concentric with the axis thereof and a cam follower lever rockably secured to the stationary frame of said gyroscope to rock in the plane of said cam, said free end of said lever having a cam lever roller journaled thereon to roll on said cam in the plane thereof, said lever including a resilient means biasing said lever towards said cam to move said cam under said roller to move said outer gimbal ring to its caged position under said roller and said lever including a solenoid plunger hinged thereto to overcome said resilient means to lift said roller from said cam to free said outer gimbal ring cam from said cam follower.

It is a third object of this invention to provide for a gyroscope having an air erection means and electric switch means for energizing the electric motor for spinning the wheel thereof, a caging cam on the outer gimbal ring of said gyroscope and a caging cam follower movably carried on a stationary support frame for said gyroscope, together with resilient means pressing said follower on said cam to cage said outer gimbal ring and a solenoid energized when said spin motor is energized to overcome said resilient means to free said cam from the restraint of said cam follower.

It is a fourth object of this invention to provide, for a gyroscope having an erection means which is continuously active when the spin motor of said gyroscope is energized, means for caging the outer gimbal ring of said gyroscope when said motor is de-energized and means for freeing said outer gimbal from said caging means after a preset delay when said motor is energized.

How these and other objects of this invention are attained is explained in the following specification referring to the attached drawing in which Fig. 1 is a top plan view conventionally showing the location of the novel parts of this invention.

Like reference numerals refer to like parts in the several figures of the drawing.

Figure 1:
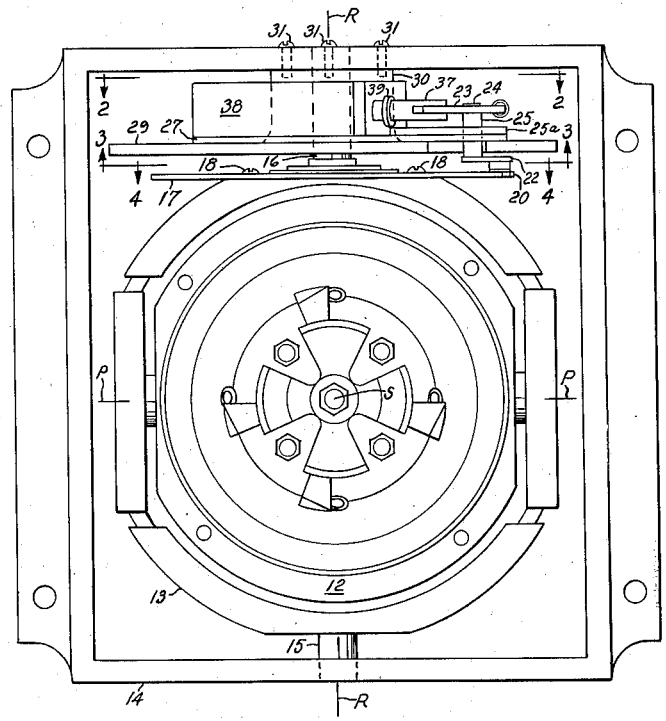

Referring now to the drawing in Fig. 1 is shown a somewhat schematic top plan view of a gyro vertical 11 in its caged or erected position. The gyroscope 11 has a vertical or spin axis S about which the spin wheel and spin motor, not shown, are rotated in the inner gimbal ring 12 when the spin motor is energized. The inner gimbal ring 12 is supported in outer gimbal ring 13 to be free to rotate in either direction about inner gimbal ring axis P perpendicular to spin axis S. The outer gimbal ring 13 is supported in stationary frame 14 to be free to rotate in either direction about outer gimbal ring axis R perpendicular to inner gimbal ring axis P. In the caged or erected position of the gyro shown the axes S, P and R are mutually perpendicular and meet at a point, not shown.

While the particular form of air erection means usefully applied in the present form in which this invention is disclosed as being practiced is not a part of this invention, a complete disclosure thereof will be found in the Judson U.S. Patent No. 2,772,570 above referred to and need not be described further here.

In Fig. 1, outer gimbal ring 13 is seen to be supported for free rotation about axis R on stationary frame 14 on bearing holes formed therein by short axle stub 15 on one side and long axle stub 16 on the other side.

Figure 4:
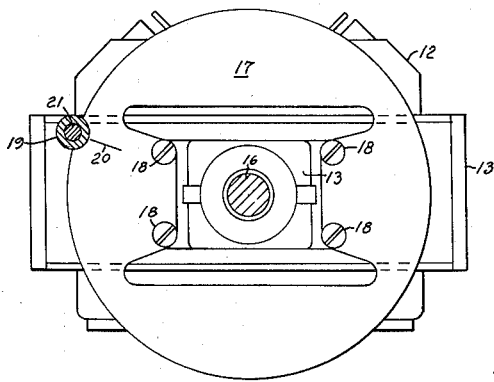
Fig. 4 is a front elevation in partial section along the line 4—4 of Fig. 1.

As shown in Figs. 1 and 4, edge disk cam 17 is secured on outer gimbal ring 13 perpendicular to axle 16 by four screws 18. At its point of minimum cam radius 20 the edge of cam 17 is notched (see also Fig. 2) to receive cam follower roller 19 carried freely rotatably on one end of its axle 21 the other end of which is fixed to the free end of cam follower lever 22 the other end of which is secured to bell crank 23 by journal 24 rockably secured in bushing 25 of bushing plate 25a held by screws 26 to solenoid bracket 27 which in turn is held by screws 28 to support disk 29 having its hub 30 secured by screws 31 to frame 14.

Figure 3:
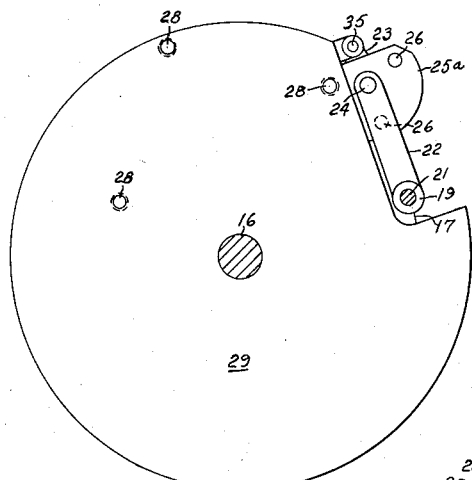
Fig. 3 is a rear elevation in partial section along the line 3—3 of Fig. 1.
Figure 2:
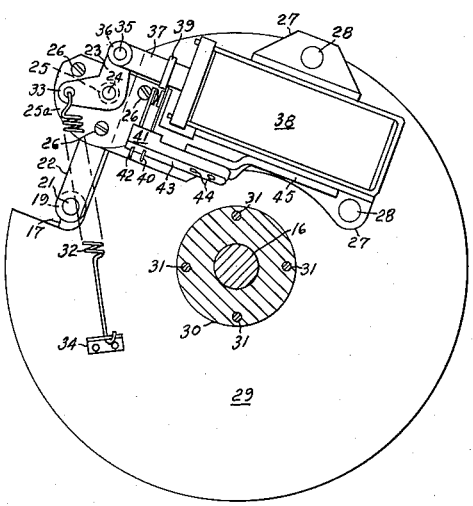
Fig. 2 is a front elevation view in partial section along the line 2—2 of Fig. 1.

Noting particularly Figs. 1 and 2 it is emphasized that the hollow bearing bushing 25 is secured by its plate 25a, screws 26, solenoid bracket 27 and its screws 28 to support disk 29 which in turn is secured by its hub 30 and screws 31 to frame 14. Also both bell crank 23 and cam follower lever 22 secured together on the same axle 24 journalled in bushing 25 are always biased towards movement in the clockwise direction in Fig. 3 or the counterclockwise direction in Figs. 2 and 4 by tension spring 32 strained between end 33 of bell crank 23 and clip 34 secured to support disk 29, to urge cam follower lever 22 to press cam follower roller 19 against the edge of cam disk 17 to rotate disk 17 with outer gimbal ring 13 until roller 19 drops into the notch at position 20 the caged or erected position of the outer gimbal ring 13.

Pivoted at 35 on the free end of the other leg 36 of bell crank 23 is solenoid plunger 37 of solenoid 38 secured to stationary support disk 29 by solenoid bracket 27. Solenoid 38 can be energized to withdraw therein its plunger 37 and rock bell crank 23 to overcome the bias of spring 32 to retire cam follower 19 from cam 17 to restore to outer gimbal ring 13 its characteristic freedom of motion about axis R.

It should be noticed in Fig. 2 that when solenoid 38 withdraws its plunger 37 the switch operating collar 39 of plunger 37 abuts and separates the longer flexible switch blade 40 of electric switch 41 from the shorter blade 42. The insulating support 43 of blades 40, 42, of switch 41 is supported by screws 44 to clip 45 of solenoid bracket 27.

To eliminate confusion all parts not required for a complete understanding of the invention by persons experienced in the art have been omitted as have also the electric circuit wires and supporting structures therefor. However a direct current electric circuit scheme is shown in Fig. 5, it being understood by those versed in the art that other wiring schemes may be used to accomplish essentially the same operating sequence.

Figure 5:
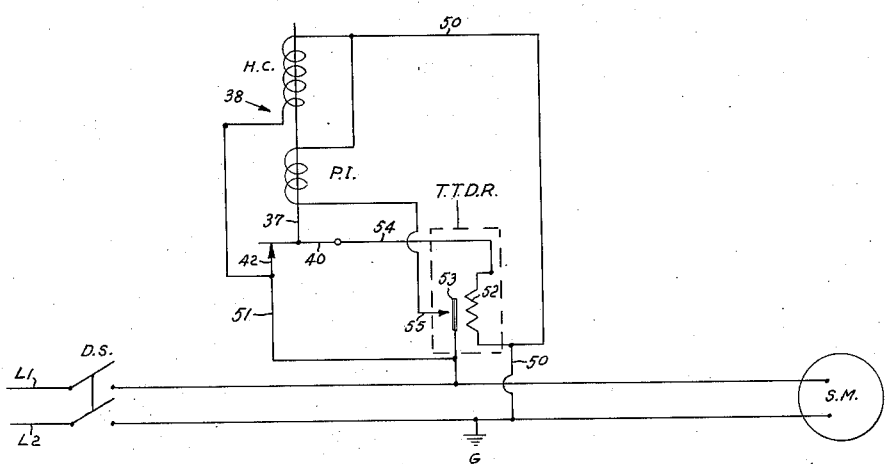
Fig. 5 is a schematic electric circuit diagram of a simplified form in which this invention may be practiced.

Referring now to Fig. 5, while remembering the previously disclosed parts and arrangements thereof, the electric lines L1 and L2 are nominal 28 v. D.C. lines with L2 grounded at G. Disconnect switch D.S. may be manually closed to energize the spin motor S.M. and simultaneously the novel caging system of this invention and conversely switch D.S. may be opened to return the motor and caging system to its standby condition.

Within the dotted line T.T.D.R. is shown the thermal time delay relay as here used. Because it is available as required I now use such a relay purchased from G-V Controls, Inc., Livingston, N.J., their Part No. LT 2105 or equivalent. The time setting used is 2 seconds plus or minus 15%.

It is to be remembered that the solenoid 38 as here used has both a holding coil, H.C., and a pull-in coil, P.I., and that when the switch D.S. is opened, the spin motor S.M., the solenoid 38, and the thermal time delay relay will soon be de-energized and the motor will be stopping while the solenoid releases its plunger low cam follower roller to cage the outer gimbal and hold it in readiness for caging the inner gimbal as the motor is next energized in the caging process.

When the switch D.S. is closed, the spin motor is immediately energized and starts coming up to its rated speed bringing with it the inertia wheel and the air pressure generating fan for operating the air erection scheme of both gimbal rings 12 and 13, like that described in the aforementioned U.S. Pat. No. 2,772,570. With the air jet torquers in operation under the control of their respective pendulums and the outer gimbal ring previously caged, the inner gimbal ring is rapidly caged.

In the meantime, current from line L2 passes in parallel through line 50 to solenoid holding coil H.C. and by line 51 to line L1 and to timing heater 52 of bimetal switch blade 53 to line 54 and through switch blade 40 and stationary contact 42 to line 51 and line L1. The solenoid holding coil H.C. does not exert sufficient magnetic force on plunger 37 to open switch 40, 42 by itself but after approximately 2 seconds heater 52 will cause bimetal blade 53 to warp into contact with stationary contact 55 to energize solenoid pull-in coil P.I. which with the aid of holding coil H.C. will actuate plunger 37 to lift switch blade 40 from its contact 42 and de-energize heater 52 to allow bimetal switch blade 53 to cool and back away from contact 35 to de-energize pull-in coil, P.I.

Holding coil, H.C. being sufficiently strong to hold plunger 37 in its actuated position once it has been actuated with the aid of pull-in coil P.I. the gyroscope will continue to operate as such with both gimbal rings free and air erection until the switch D.S. is opened to de-energize the motor S.M. and the holding coil H.C. to release cam follower lever 22 to spring 32 to cage the outer gimbal ring in readiness for a new cycle of operation.

In this novel gyroscope caging before erection scheme it is novel and essential that the outer gimbal ring be held in caged position before and during the caging of the inner gimbal ring by bringing the spin motor and the erection air fan up to speed.

By this method it requires only about 2 seconds to bring the spin motor sufficiently up to speed with the outer gimbal caged to sufficiently erect the inner gimbal ring to allow the release of the outer gimbal ring and put the air erection mechanism in complete control of both gimbal rings.

The time delay in releasing the outer gimbal ring after energizing the spin motor is an essential concept in this invention.

With the structure as disclosed, if the switch D.S. is accidentally opened while the gyroscope is in normal operation, the motor, coasting as a generator will maintain the holding coil H.C. sufficiently energized for about ten seconds to maintain the gyroscope in normal operation.

Having recited some of the objects of this invention, illustrated and described a preferred form in which the invention may be practiced and described its operation, I claim:

1. In combination with a gyroscope having a motor driven spin wheel mounted for free rotation about a spin axis in an inner gimbal ring mounted for free rotation about an inner gimbal ring axis in an outer gimbal ring mounted for free rotation about an outer gimbal ring axis in a stationary frame, said gyroscope being said to be caged when said axes are mutually perpendicular at a point and said gyroscope being said to be erected when caged with said spin axis gravitationally vertical, means powered by said motor when said motor is energized continuously to urge said spin axis toward its erected position, means effective when said motor is not energized to hold one of said gimbal rings in the position it takes when said gyroscope is caged and means effective when said motor is energized first to energize said continuously erecting means to move the other of said gimbal rings toward the position it takes when said gyroscope is caged and after a preset time delay to release said one of said gimbal rings from its caged position to release said gyroscope for freedom about its three axes to allow said continuously erecting means continuously to erect said gyroscope about the gravity vertical position of its spin axis.

2. In combination with a gyroscope having an electric motor for driving the spin wheel thereof and multiple pendulum controlled air jet means for continuously erecting said gyroscope towards the vertical position of its spin axis, said spin wheel including an air fan secured thereto to spin therewith for supplying air under pressure to said air jet means when said motor is energized, the improvement which includes a caging cam secured to one of the two gimbal rings of said gyroscope to move freely with said ring in either direction about the axis thereof, a cam follower secured to the stationary frame of said gyroscope for movement substantially perpendicularly to the cam surface of said cam, resilient means for biasing said cam follower toward the cam surface of said cam to press said cam with said ring angularly about the axis of said ring toward the caged position thereof, said cam including means for stopping the angular motion of said ring at its said caged position, electric means for overcoming when energized the bias of said resilient means and lifting said cam follower from said cam, a source of electric power, a first electric circuit for energizing said electric motor, a second electric circuit for energizing said electric means, a single electric switch for simultaneously connecting both said circuits to said source and time delay means in said second circuit for delaying the sufficient energization of said electric means after the energization of said motor in said first crcuit until the other gimbal ring of said gyroscope is moved to near its caged position, whereby when said switch is opened said two circuits will be de-energized and said biasing means wll move said cam follower to cage said one gimbal ring and secure said ring in its caged position until said switch is again closed and said other gimbal ring is again substantially caged to its caged position.

3. In combination with a gyroscope having a stationary frame, an outer gimbal ring carried on said frame for rotation in either direction on an outer ring axis, an inner gimbal ring carried on said outer gimbal ring on an inner ring axis perpendicular to said outer ring axis, a spin wheel carried on said inner gimbal ring on a spin axis perpendicular to said inner ring axis, said axes intercepting at a point, an electric motor for driving said spin wheel and a gravity controlled vertical erection means for said gyroscope which is continuously active when said motor is energized, the addition of means for caging only one of the gimbal rings of said gyroscope in response to the deenergization of said motor and means for freeing said outer gimbal ring from said caging means a pre-set time after said motor is energized.

4. The combination of claim 3 in which said one of said gimbal rings is said outer gimbal ring, said caging means includes a caging cam on the outer gimbal ring of said gyroscope and a caging cam follower swingably carried on the stationary frame of said gyroscope in the plane of said cam together with resilient means pressing said follower on the face of said cam to cage said outer gimbal ring and said means for freeing said outer gimbal means from said caging means includes a solenoid circuit energized when said spin motor is energized to overcome said resilient means to free said cam from the restraint of said cam follower.

References Cited in the file of this patent

UNITED STATES PATENTS

| | | |
|---|---|---|
| 2,441,307 | Alkan | May 11, 1948 |
| 2,521,379 | Leathers et al. | Sept. 5, 1950 |
| 2,741,922 | Nolan et al. | Apr. 17, 1956 |
| 2,772,570 | Judson | Dec. 4, 1956 |
| 2,874,577 | Shirley | Feb. 24, 1959 |
| 2,907,212 | Garnier | Oct. 6, 1959 |